US00RE39145E

(19) United States
(12) Reissued Patent
Perry et al.

(10) Patent Number: US RE39,145 E
(45) Date of Reissued Patent: *Jun. 27, 2006

(54) METHOD AND APPARATUS FOR IN-SITU MONITORING OF PLASMA ETCH AND DEPOSITION PROCESSES USING A PULSED BROADBAND LIGHT SOURCE

(75) Inventors: Andrew Perry, Fremont, CA (US); Randall Mundt, Pleasanton, CA (US)

(73) Assignee: LAM Research Corporation, Fremont, CA (US)

( * ) Notice: This patent is subject to a terminal disclaimer.

(21) Appl. No.: 10/603,740

(22) Filed: Jun. 26, 2003

Related U.S. Patent Documents

Reissue of:
(64) Patent No.: 6,160,621
Issued: Dec. 12, 2000
Appl. No.: 09/409,842
Filed: Sep. 30, 1999

(51) Int. Cl.
*G01B 11/06* (2006.01)

(52) U.S. Cl. ..... 356/630; 250/559.27; 356/72
(58) Field of Classification Search ..... 356/503, 356/630–632, 445–448, 72; 250/559.27
See application file for complete search history.

(56) References Cited

U.S. PATENT DOCUMENTS

| | | | | |
|---|---|---|---|---|
| 4,080,076 A | | 3/1978 | Carr | |
| 4,726,679 A | | 2/1988 | McCaffrey | |
| 4,968,142 A | * | 11/1990 | Manning et al. | 356/316 |
| 5,255,089 A | | 10/1993 | Dybas et al. | |
| 5,403,433 A | * | 4/1995 | Morrison et al. | 356/632 |
| 5,461,236 A | * | 10/1995 | Gram et al. | 250/461.1 |
| 5,880,823 A | * | 3/1999 | Lu | 356/72 |
| 6,111,634 A | * | 8/2000 | Pecen et al. | 356/72 |

* cited by examiner

*Primary Examiner*—Richard A. Rosenberger
(74) *Attorney, Agent, or Firm*—Locke Liddell & Sapp LLP

(57) ABSTRACT

An interferometric method and apparatus for in-situ monitoring of a thin film thickness and of etch and deposition rates using a pulsed flash lamp providing a high instantaneous power pulse and having a wide spectral width. The optical path between the flash lamp and a spectrograph used for detecting light reflected from a wafer is substantially transmissive to the ultraviolet range of the spectrum making available to the software algorithms operable to calculate film thickness and etch and deposition rates desirable wavelengths.

25 Claims, 3 Drawing Sheets

METHOD AND APPARATUS FOR IN-SITU MONITORING OF PLASMA ETCH AND DEPOSITION PROCESSES USING A PULSED BROADBAND LIGHT SOURCE

Matter enclosed in heavy brackets [ ] appears in the original patent but forms no part of this reissue specification; matter printed in italics indicates the additions made by reissue.

BACKGROUND OF THE INVENTION

The present invention relates to the field of semiconductor substrate processing and, more particularly, to the monitoring of material thickness and etch and deposition rates during plasma etch and deposition processes of semiconductor substrates.

The manufacture of an integrated circuit device requires the formation of various layers (both conductive, semiconductive, and non-conductive) above a base substrate to form necessary components and interconnects. During the manufacturing process, removal of a certain layer or portions of layers must be achieved in order to form the various components and interconnects. This is commonly accomplished by means of an etching process. Etching techniques in use include wet, or chemical etching, and dry, or plasma etching. The latter technique is typically dependent upon the generation of reactive species from process gases that are impinged on the surface of the material to be etched. A chemical reaction takes place between the material and these species and the gaseous reaction product is then removed from the surface.

With reference to FIG. 1, creating plasma for use in manufacturing or fabrication processes typically begins by introducing various process gases into a plasma chamber 10 of a plasma reactor, generally designated 12. These gases enter the chamber 10 through an inlet 13 and exit through an outlet 15. A workpiece 14, such as an integrated circuit wafer is disposed in the chamber 10 held upon a wafer holder 16. The reactor 12 also includes a plasma density production mechanism 18 (e.g. an inductive coil). A plasma inducing signal, supplied by a plasma inducing power supply 20 is applied to the plasma density production mechanism 18, the plasma inducing signal preferably being an RF signal. A top portion 22, constructed of a material transmissive to RF radiation such as ceramic or quartz, is incorporated into the upper surface of the chamber 10. The top portion 22, allows for efficient transmission of RF radiation from the coil 18 to the interior of the chamber 10. This RF radiation in turn excites the gas molecules within the chamber generating a plasma 24. The generated plasma 24 is useful in etching layers from a wafer or for depositing layers upon a wafer as is well known in the art.

An important consideration in all etch and deposition processes is the monitoring of process parameters such as etch and deposition rate, film thickness and determining a time, referred to as the endpoint, at which to end the process. Common methods for monitoring plasma etch and deposition processes include spectroscopy and interferometry. Spectroscopic methods include monitoring the chemical species in the plasma chamber and detecting a change in the concentration of an emitting species in the plasma when one film layer is cleared during an etching process and the underlying film is exposed. This method is not useful however in several etch processes where an underlying film is not exposed. For example, in a gate etch process, a layer of polycrystalline silicon or amorphous silicon lies above a thin oxide layer. The polysilicon layer must be etched away leaving the thin oxide layer without causing any pitting or punch through to the oxide layer. In order to achieve this, the etch chemistry must be changed at a point before the polysilicon layer is cleared. Spectroscopy is also not useful in shallow trench isolation and recess etch processes.

Interferometric methods are disclosed in U.S. Pat. No. 5,450,205 to Sawin et al. and include laser interferometry and optical emission interferometry. In laser interferometry, an incident laser beam strikes an interface between a wafer and a chamber environment such as a plasma of the plasma chamber. A reflected beam is directed through a bandpass filter to a photodiode where an interferometry signal is recorded as a function of time. The bandpass filter prevents plasma emission from entering the photodiode while allowing the reflected laser beam to strike the photodiode.

In optical emission interferometry, the light generated by the plasma is used as the light source for interferometry. Light is collected from the plasma chamber with a lens and passed through a bandpass filter and into a photodiode. The bandpass filter defines the wavelength of light being used as the interferometric signal and blocks light at unwanted wavelengths to prevent the plasma background from reaching the photodiode. In both laser interferometry and optical emission interferometry, the etching rate and film thickness is easily calculated by detecting the time between adjacent maxima or adjacent minima in the interferometric signal.

The use of broadband light sources in interferometric methods is also well known in the art. U.S. Pat. No. 5,291,269 to Ledger discloses an apparatus for measuring the thickness of a thin film layer including an extended light source that forms a diffuse polychromatic light beam. The beam illuminates an entire surface of a wafer and is reflected off the wafer and passed through filters to form a monochromatic light beam that is projected onto a detector array. The monochromatic light beam displays an interference fringe pattern image on the detector array. This pattern is processed to create a map of measured reflectance data that is compared to reference reflectance data to generate a map of the thin film layer thickness over a full aperture of the wafer.

To undertake interferometric measurements through a plasma, it is necessary to remove the contribution of the plasma emission from the interferometer signal and thereby reduce the effect of this contribution upon the algorithms used to model the thin film structures on the wafer. Fluctuations in the plasma emission can also confound models used to determine the etch rate of films on the wafer. The use of laser interferometry greatly reduces sensitivity to plasma emission but limits measurement to a single wavelength. Optical emission interferometry techniques depend on the plasma emission itself and are therefore sensitive to fluctuations in the emission and the range of wavelengths available for analysis varies with the process chemistry. Methods using extended broadband light sources provide a range of wavelengths useful for analysis but generally suffer from problems of low signal to noise ratio and low intensity interferometric signals.

It would therefore be desirable to provide a method and apparatus for monitoring a plasma etch or deposition process that reduces the sensitivity of the detector to plasma emission but that allows for measurements over a broad range of wavelengths, and in particular, measurement in the ultraviolet region of the spectrum. Materials used in integrated circuit fabrication are generally more reflective in the ultraviolet range and the use of shorter wavelengths allows for greater resolution of the interferometric signal providing for increased accuracy in film thickness measurement.

Prior art ultraviolet light sources are typically extended sources and coupling light efficiently from these sources is optically difficult. Additionally, these sources tend to be monochromatic sources. Finally these sources typically have relatively low intensity thereby making the interferometric signal harder to detect above the plasma emission background.

It would therefore be desirable to provide a method and apparatus for monitoring a plasma etch or deposition process that provides a non-extended light source for generating light that is efficiently coupled into an optical system.

It would further be desirable to provide a method and apparatus for monitoring a plasma etch or deposition process that provides an interferometric signal having a broad spectral range, high intensity and a high signal to noise ratio.

Finally, it would be desirable to provide an apparatus for monitoring a plasma etch or deposition process including a light source having a longer lifetime than the extended broadband light sources of the prior art.

SUMMARY OF THE INVENTION

The present invention provides an interferometric method and apparatus for insitu monitoring of a thin film thickness and of etch and deposition rates using a pulsed flash lamp providing a high instantaneous power pulse having a wide spectral width. The optical path between the flash lamp and a spectrograph used for detecting light reflected from a wafer is substantially transmissive to the ultraviolet range of the spectrum making available to the software algorithms operable to calculate film thickness and etch and deposition rates the desirable short wavelengths.

According to a first aspect of the invention, the apparatus includes a light source, a collimator, a light sensitive detector such as a spectrograph for monitoring an intensity from the light reflected from the wafer, the spectrograph being operable to disperse light into multiple wavelengths that are detected by multiple detectors, and a data processing element for processing the signal from the spectrograph and estimating the thickness of any film on the substrate. The light source is preferably a flash lamp emitting a broadband, optical radiation synchronous with a data acquisition cycle of the spectrograph. Data are recorded only during the short output pulse from the flash lamp and the integration time of the spectrograph is thereby reduced. The background light received from the processing plasma is proportional to the integration time so the effect of the plasma emission on the spectrograph signal is largely eliminated.

According to a second aspect of the invention, plasma intensity is recorded while the flash lamp is off and the detected signal is subtracted from the signal recorded with the flash lamp on. This embodiment further reduces the effect of the plasma emission on the measurement.

According to a third aspect of the invention, the spectrograph comprises a multi-channel spectrograph. A channel of the spectrograph is utilized to monitor the flash lamp signal on each pulse. Variations in the flash lamp signal are removed from the signal to reduce variations in the interferometer signal.

These and other advantages of the present invention will become apparent to those skilled in the art upon a reading of the following description of the invention and a study of the several figures of the drawings.

BRIEF DESCRIPTION OF THE DRAWINGS

The present invention will be readily understood by the following detailed description conjunction with the accompanying drawings, with like reference numerals designating like elements.

DETAILED DESCRIPTION OF THE PREFERRED EMBODIMENTS

Figure 1:
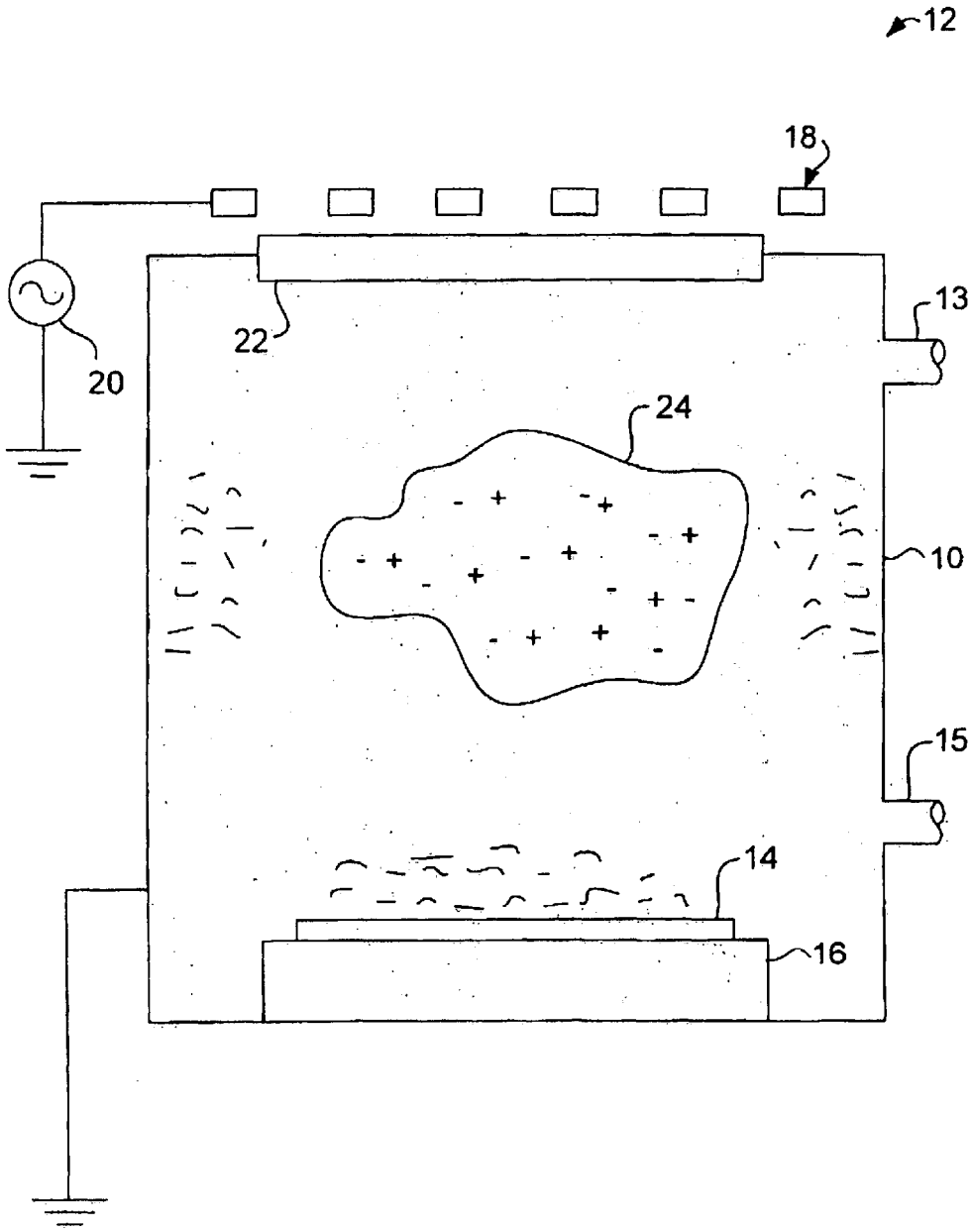
Fig. 1 (Prior Art)
FIG. 1 is a schematic view of a prior art plasma reactor.
Figure 2:
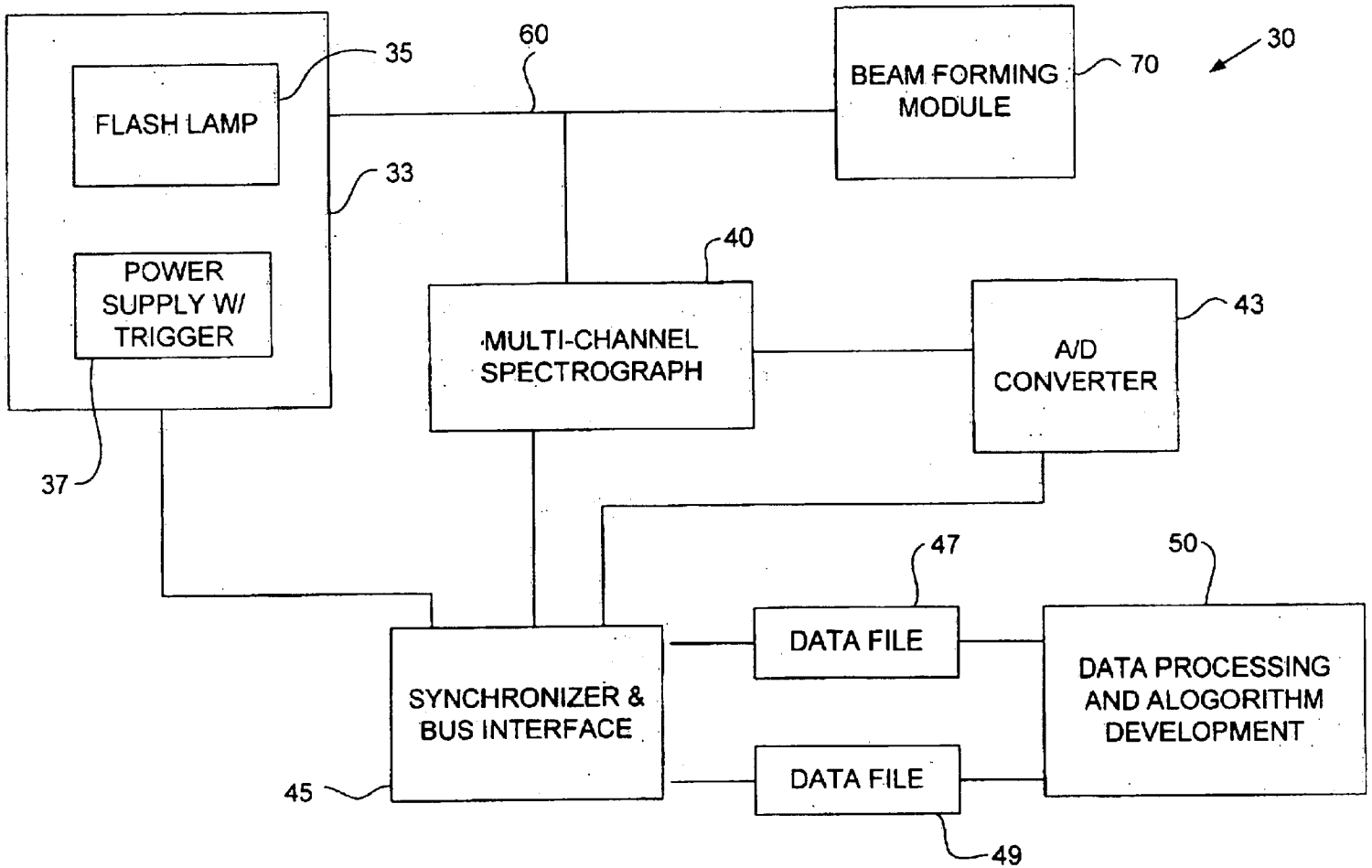
FIG. 2 is a block diagram of the monitoring system of the present invention.

FIG. 2 shows the components of a system generally designated 30 using multiple wavelength illumination. The system 30 comprises an illumination module 33 comprising a flash lamp 35 and a power supply with trigger 37. The system 30 also comprises a multi-channel spectrograph 40, an analog-to-digital converter 43, a synchronizer and bus interface 45, a first and second data file 47 and 49 and a data processing and algorithm development block 50. An optical fiber 60 optically connects the flash lamp 35 and the spectrograph 40 to a beam forming module 70 disposed outside of a plasma chamber. This system 30 is used to calculate the thickness of a film on a wafer positioned within the plasma chamber, as described below.

Figure 3:
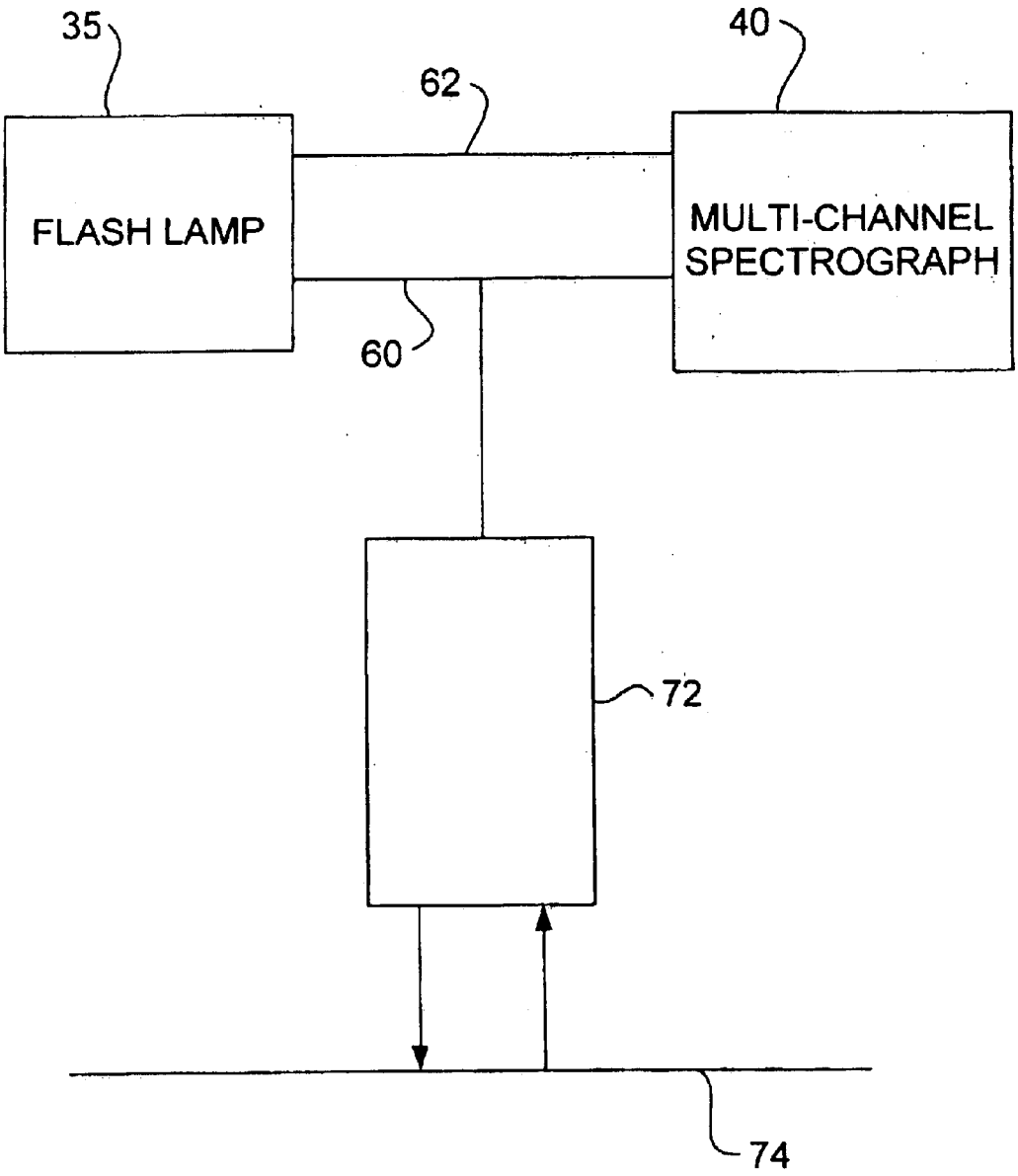
FIG. 3 is an optical diagram of the present invention.

The flash lamp 35 generates broadband light in the range of about 200 nm to 2 microns. The optical fiber 60 carries the broadband light from the flash lamp 35 to the beam forming module 70 disposed outside the plasma chamber. The beam forming module 70 includes a collimator 72 (FIG. 3) which changes the diameter of the broadband light to collimate a substantially parallel beam on a wafer 74 substantially normal to the surface of the wafer 74. The collimator 72 includes a single or multiple lens or microscope objective. The collimator 72 further focuses reflected light back on the optical fiber 60.

When the broadband light beam illuminates the wafer 74, the wafer 74 reflects part of the broadband light beam. The spectrograph 40 measures the spectrum of the reflected light and generates an analog signal representing the spectrum of the reflectance. The analog-to-digital converter 43 converts the analog signal to a digital signal and sends the digital signal to the synchronizer and bus interface 45.

The synchronizer and bus interface 45 are operable trigger the light source 35 to generate the light beam and cause the spectrograph 40 to detect the spectrum of the reflected beam from the wafer 74 at pre-determined time intervals. The synchronizer and bus interface 45 are also operable to cause the spectrograph to detect the spectrum of the plasma emission reflected from the wafer 74 when it is not being illuminated by the flash lamp 35.

The synchronizer and bus interface 45 coordinates three functions. First, it sends a periodic trigger to the power supply 37, causing the flash lamp 35 to generate a broadband light pulse to illuminate the wafer 74 synchronous with a data acquisition cycle of the spectrograph 40. Second, the synchronizer and bus interface 45 records the digital signal from the analog-to-digital converter 43 in the first data file 47. Third, the synchronizer and bus interface 45 records a second digital signal from the analog-to-digital converter 43 in the second data file 49 when the wafer 74 is not illuminated.

The information stored in the first and second data files 47 and 49 is used in a data processing and algorithm development block 50. According to a first aspect of the invention the block 50 uses the information stored in the first data file 47 to calculate the thickness of the film on the wafer 74 and the etch or deposition rate. Computer analysis of the detected spectral reflection function, especially its minima and maxima, provides the thickness of the film as well as the etch or deposition rate. From this data a process endpoint is also easily calculated.

According to a second aspect of the invention the block 50 uses the information stored in the second data file 49 to subtract the plasma emission signal from the illuminated interferometric signal. The block 50 then uses this information and the information stored in the first data file 47 to calculate the thickness of the film on the wafer 74 and the etch or deposition rate.

According to a third aspect of the invention, the intensity of the pulse generated by the flash lamp 35 is detected by the spectrograph 40 by means of optical fiber 62. Information relating to variations in pulse intensity caused by, for example, aging of the flash lamp 35, is stored in a third data file (not shown). The block 50 uses the information stored in the third data file to normalize the information of the first data file 47 for variations in pulse intensity. The block 50 then uses this normalized information and the information stored in the first data file 47 to calculate the thickness of the film on the wafer 74 and the etch or deposition rate.

The flash lamp 35 of the preferred embodiment is preferably a xenon flash lamp having a small arc size to more nearly approximate a point source for efficient coupling to the optical system of the invention. Advantageously, the xenon flash lamp provides a high energy pulse of short duration (on the order of one microsecond). Hence the integration time of the spectrograph 40 can be reduced and the effect of the plasma emission on the interferometric signal largely eliminated. Additionally, the average energy delivered to the wafer 74 is low. Further, by using a pulsed light source, the lifetime of the source can be extended.

The method and apparatus of the invention is preferably used with a system that is substantially transmissive to ultraviolet radiation. Optical viewing windows and collimators transmissive to ultraviolet radiation are well known in the art and their properties and arrangement in a plasma chamber will not be further described.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given therein, but may be modified within the scope of the appended claims.

We claim:

[1. A process monitor for determining process parameters during a plasma etch process of a water, the process monitor comprising:

a flash lamp emitting a broad-band optical radiation;

a spectrograph responsive to optical radiation reflected from the wafer; and a data processing element for processing a first signal from the spectrograph, the first signal representative of emitted optical radiation reflected from the wafer, and determining a process parameter.]

[2. A process monitor according to claim 1 further comprising a beam forming module operable to collimate the emitted optical radiation.]

3. [A process monitor according to claim 2] *A process monitor for determining process parameters during a plasma etch process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter; and*

*a beam forming module operable to collimate the emitted optical radiation* wherein the collimated optical radiation is incident normally to the wafer.

4. [A process monitor according to claim 1] *A process monitor for determining process parameters during a plasma etch process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter* wherein a spectrograph integration period is synchronized to the flash lamp.

5. [A process monitor according to claim 1] *A process monitor for determining process parameters during a plasma etch process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter* wherein a second signal representative of optical radiation reflected from the wafer during a period when the flash lamp is not emitting broad-band optical radiation is processed by the data processing element and subtracted from the first signal to determine a process parameter.

6. A process monitor according to claim [1] *5* wherein a third signal representative of the intensity of the emitted radiation is processed by the data processing element to normalize the first signal.

7. A process monitor according to claim 6 wherein the normalized first signal is processed by the data processing element to determine the process parameter.

8. A process monitor according to claim [1] *5* wherein the process parameter further comprises a thickness of a layer carried by the wafer.

9. [A process monitor according to claim 1] *A process monitor for determining process parameters during a plasma etch process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter; and*

*a beam forming module operable to collimate the emitted optical radiation* wherein the process parameter further comprises an etch rate of a layer carried by the wafer.

10. A process monitor according to claim [1] *9* wherein the process parameter further comprises a process endpoint.

[11. A process monitor for determining process parameters during a plasma deposition process of a wafer, the process monitor comprising:

a flash lamp emitting a broad-band optical radiation;

a spectrograph responsive to optical radiation reflected from the wafer; and a data processing element for processing a first signal from the spectrograph, the first signal representative of emitted optical radiation reflected from the wafer, and determining a process parameter.]

[12. A process monitor according to claim 11 further comprising a beam forming module operable to collimate the emitted optical radiation.]

13. [A process monitor according to claim 12] *A process monitor for determining process parameters during a plasma deposition process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter; and*

*a beam forming module operable to collimate the emitted optical radiation* wherein the collimated optical radiation is incident normally to the wafer.

14. [A process monitor according to claim 11] *A process monitor for determining process parameters during a plasma deposition process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter and* wherein a spectrograph integration period is synchronized to the flash lamp.

15. [A process monitor according to claim 11] *A process monitor for determining process parameters during a plasma deposition process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter and* wherein a second signal representative of optical radiation reflected from the wafer during a period when the flash lamp is not emitting broad-band optical radiation is processed by the data processing element and subtracted from the first signal to determine a process parameter.

16. A process monitor according to claim [11] *15* wherein a third signal representative of the intensity of the emitted radiation is processed by the data processing element to normalize the first signal.

17. A process monitor according to claim 16 wherein the normalized first signal is processed by the data processing element to determine the process parameter.

18. A process monitor according to claim [11] *15* wherein the process parameter further comprises a thickness of a layer carried by the wafer.

19. [A process monitor according to claim 11] *A process monitor for determining process parameters during a plasma deposition process of a wafer, the process monitor comprising:*

*a flash lamp emitting a broad-band optical radiation;*

*a spectrograph responsive to optical radiation reflected from the wafer;*

*a data processing element for processing a first signal from the spectrograph, the first signal representative of emitted optical radiation reflected from the wafer, and determining a process parameter and* wherein the process parameter further comprises a deposition rate of a layer carried by the wafer.

20. A process monitor according to claim [11] *19* wherein the process parameter further comprises a process endpoint.

[21. A method of monitoring a process and for determining process parameters during a plasma process of a wafer, the method comprising:

providing a flash lamp emitting a broad-band optical radiation;

providing a spectrograph responsive to optical radiation reflected from the wafer; and providing a data processing element for processing a first signal from the spectrograph, the first signal representative of emitted optical radiation reflected from the wafer, and determining a process parameter.]

[22. A method of monitoring a process as recited in claim 21 further comprising providing a beam forming module operable to collimate the emitted optical radiation.]

23. [A method of monitoring a process as recited in claim 22] *A method of monitoring a process and for determining process parameters during a plasma process of a wafer, the method comprising:*

*providing a flash lamp emitting a broad-band optical radiation;*

*providing a spectrograph responsive to optical radiation reflected from the wafer;*

*providing a data processing element for processing a first signal from the spectrograph, the first signal representative of emitted optical radiation reflected from the wafer, and determining a process parameter; and*

*providing a beam forming module operable to collimate the emitted optical radiation* wherein the collimated optical radiation is incident normally to the wafer.

24. [A method of monitoring a process as recited in claim 22 further comprising] *A method of monitoring a process and for determining process parameters during a plasma process of a wafer, the method comprising:*

*providing a flash lamp emitting a broad-band optical radiation;*

*providing a spectrograph responsive to optical radiation reflected from the wafer;*

*providing a data processing element for processing a first signal from the spectrograph, the first signal representative of emitted optical radiation reflected from the wafer, and determining a process parameter and* synchronizing a spectrograph integration period to the flash lamp.

25. [A method of monitoring a process as recited in claim 21 further comprising] *A method of monitoring a process and for determining process parameters during a plasma process of a wafer, the method comprising:*

*providing a flash lamp emitting a broad-band optical radiation;*

*providing a spectrograph responsive to optical radiation reflected from the wafer;*

*providing a data processing element for processing a first signal from the spectrograph, the first signal representative of emitted optical radiation reflected from the wafer, and determining a process parameter and* processing a second signal representative of optical radiation reflected from the wafer during a period when the flash lamp is not emitting broad-band optical radiation and subtracting the processed second signal to determine a process parameter.

26. A method of monitoring a process as recited in claim [21] *25* further [comprising] *processing* a third signal representative of the intensity of the emitted radiation to normalize the first signal.

27. A method of monitoring a process as recited in claim 26 further comprising processing the normalized first signal to determine the process parameter.

28. A method of monitoring a process as recited in claim [21] *25* wherein the process parameter further comprises a thickness of a layer carried by the wafer.

29. [A method of monitoring a process as recited in claim 21] *A method of monitoring a process and for determining process parameters during a plasma process of a wafer, the method comprising:*

*providing a flash lamp emitting a broad-band optical radiation;*

*providing a spectrograph responsive to optical radiation reflected from the wafer;*

*providing a data processing element for processing a first signal from the spectrograph, the first signal representative of emitted optical radiation reflected from the wafer, and determining a process parameter* wherein the process parameter further comprises an etch rate of a layer carried by the wafer.

30. [A method of monitoring a process as recited in claim 21] *A method of monitoring a process and for determining process parameters during a plasma process of a wafer, the method comprising:*

*providing a flash lamp emitting a broad-band optical radiation;*

*providing a spectrograph responsive to optical radiation reflected from the wafer;*

*providing a data processing element for processing a first signal from the spectrograph, the first signal representative of emitted optical radiation reflected from the wafer, and determining a process parameter* wherein the process parameter further comprises a deposition rate of a layer carried by the wafer.

31. A method of monitoring a process as recited in claim [21] *30* wherein the process parameter further comprises a process endpoint.

* * * * *

UNITED STATES PATENT AND TRADEMARK OFFICE

CERTIFICATE OF CORRECTION

PATENT NO. : RE 39,145 E
APPLICATION NO. : 10/603740
DATED : June 27, 2006
INVENTOR(S) : Andrew Perry et al.

It is certified that error appears in the above-identified patent and that said Letters Patent is hereby corrected as shown below:

Title Page, after Item (57) Abstract, insert:

-- REEXAMINATION RESULTS

The questions raised in reexamination request No. 90/006,192, filed 01/14/2002, has been considered and the results thereof are reflected in this reissue patent which constitutes the reexamination certificate required by 35 U.S.C. 307 as provided in 37 CFR 1.570(e).--

Signed and Sealed this

Twelfth Day of December, 2006

JON W. DUDAS
*Director of the United States Patent and Trademark Office*